United States Patent
Arai (10) Patent No.: US 6,445,821 B1
(45) Date of Patent: Sep. 3, 2002

(54) PATTERN MATCHING CODING DEVICE USING PATTERN MATCHING AND CODING METHOD THEREFOR

(75) Inventor: Mitsutoshi Arai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/294,366

(22) Filed: Apr. 20, 1999

(30) Foreign Application Priority Data

Apr. 21, 1998 (JP) .......................................... 10-110835

(51) Int. Cl.⁷ ................................................ G06K 9/03
(52) U.S. Cl. ........................ 382/209; 382/176; 382/232
(58) Field of Search ................................ 382/135, 162, 382/165, 173–179, 209, 217–218, 309, 317–319, 321; 358/296, 302

(56) References Cited

U.S. PATENT DOCUMENTS

| | | | |
|---|---|---|---|
| 4,410,916 A | | 10/1983 | Pratt et al. |
| 4,606,069 A | | 8/1986 | Johnsen |
| 4,922,545 A | | 5/1990 | Endoh et al. |
| 5,828,461 A | * | 10/1998 | Kubo et al. ................. 358/296 |
| 6,016,361 A | * | 1/2000 | Hongu et al. ................ 382/209 |
| 6,052,479 A | * | 4/2000 | Hiraishi et al. ............. 382/162 |
| 6,058,225 A | * | 5/2000 | Mori et al. .................. 382/321 |
| 6,091,844 A | * | 7/2000 | Fuji et al. ................... 382/135 |
| 6,115,494 A | * | 9/2000 | Sonoda et al. .............. 382/165 |
| 6,148,121 A | * | 11/2000 | Fujimori et al. ............ 382/309 |

FOREIGN PATENT DOCUMENTS

| | | |
|---|---|---|
| JP | 6-38048 | 2/1994 |
| JP | 6-152982 | 5/1994 |

OTHER PUBLICATIONS

Howard, Paul G., "Lossless and Lossy Compression of Text Images by Soft Pattern Matching", ISO/JTC 1/SC 29/WG 1 (ITU–Y SG8) *Coding of Still Pictures*, Jun. 30, 1995.

\* cited by examiner

*Primary Examiner*—Jose L. Couso
*Assistant Examiner*—Gregory Desire
(74) *Attorney, Agent, or Firm*—Sughrue Mion, PLLC (57) ABSTRACT

Image data is separated to character region and image region in a character/image separating portion (102). A mark is cut off from the character region by a mark cut-off portion (103). The image region is inputted to both the mark cut-off portion and an image period determining portion (104). The image period determining portion determines the period of grid image and dither image in the image region and notifies that period information to the mark cut-off portion. The mark cut-off portion cuts off the mark from an image in accordance with the period information. The mark cut-off by the mark cut-off portion is accumulated in an accumulating portion (106) for use as a library and it is determined whether or not there is a match library in old libraries by a match determining portion (105). If the match determining portion determines that there is a match library, it sends both the mark and match library to a coding portion (107). The coding portion carries out arithmetic coding by using a template for referring to the mark and reference match library at the same time.

11 Claims, 6 Drawing Sheets

FIG. 1 PRIOR ART

MARK

FIG. 2A

PRIOR ART

MATCH LIBRARY

FIG. 2B

PRIOR ART

MARK

PATTERN MATCHING CODING DEVICE USING PATTERN MATCHING AND CODING METHOD THEREFOR

BACKGROUND OF THE INVENTION

1. Field of the Invention

The present invention relates to a pattern matching coding device using pattern matching and a coding method therefor, and more particularly to a pattern matching coding device for coding by extracting a mark from an image region and a character region and a coding method therefor.

2. Description of the Related Art

As a document on the conventional art, ISO/IEC JTC 1/SC 29/WGI N205 Lossless and Lossy Compression of Test Images by Soft Pattern Matching, pages 1–29 (issued on Jun. 30, 1995) by Paul G. Howard (AT & T Bell Labs) is accessible.

The above-mentioned document states a coding method which is effective for image data including mainly binary character and image and employs a pattern matching coding system. According to this conventional pattern matching coding method, characters are extracted from an image in a small unit such as a unit of a single character (hereinafter referred to as mark) and that mark is compared with a plurality of marks accumulated preliminarily (hereinafter referred to as library).

If there is a mark equivalent to an extracted mark in a library, when the extracted mark is coded, also that match mark in the library is referred to as a part of a coding template at the same time, thereby making it possible to achieve coding.

However, such a method of the conventional art has a problem that since only the character region is an object for processing and a conventional coding method is applied for the image region, compression rate is not improved.

Further, according to the conventional method, since different coding portions need to be provided for the character region and image region, there is a problem that the circuit size is enlarged.

SUMMARY OF THE INVENTION

It is an object of the present invention to provide a pattern matching coding device in which a mark is extracted also from the image region and subjected to the same processing as the character region, thereby eliminating the necessity of a coding portion dedicated for the image region, so that the circuit size can be reduced.

Further, another object of the present invention is to provide a pattern matching coding device in which when the mark is cut off from the image region, a periodicity of the object image is recognized and a region of a size matching with that period is cut off from the image as a mark, thereby making it possible to achieve a high compression rate.

According to the present invention, there is obtained a pattern matching coding device comprising: a character/image separating portion for separating an inputted image data to a character region and an image region; a mark cut-off portion for cutting off a mark from the character region; an image period determining portion for determining a period of a grid image and a dither image the image region and notifying the period information to the mark cut-off portion, a match determining portion for determining whether or not there is a match library in old libraries; an accumulating portion for accumulating the mark cut off by the mark cut-off portion and using it as a library; and a coding portion for carrying out arithmetic coding using a template for referring to the mark cut off by the mark cut-off portion and reference match library accumulated in the accumulating portion at the same time.

Further, according to the present invention, there is obtained a pattern matching coding device comprising: a memory for accumulating inputted first image data; a boundary tracing portion for fetching second image data of a necessary part from the memory and cutting off a mark; a mark correlation check portion in which a first mark larger than a predetermined value is inputted from the boundary tracing portion and an observation window for observing a pixel on a straight line is moved in the first mark so as to search for a pixel having a high correlation; a mark redividing portion for sending period information observed in the mark correlation check portion and redividing the first mark to a size matching with the period; an accumulative FIFO memory for accumulating the redivided second mark; a match determining portion for referring to libraries accumulated in the accumulative FIFO memory and determining whether or not there is any library matching with the second mark or a third mark of normal size sent from the boundary tracing portion; a match template to which, by determining that the library sent from the match determining portion is matching with a fourth mark and sent from the match determining portion with the fourth mark, it is sent from the match determining portion together with the fourth mark as a match library; an unmatch template to which only the fourth mark from the match determining portion is sent; and an arithmetic coder for outputting a template value of the unmatch template as an encoded code and outputting a template value from the match template as an encoded code.

Still further, according to the present invention, there is obtained a coding method for a pattern matching coding device, wherein image data is separated to character region and image region by a character/image separating portion; a mark is cut off from the character region by a mark cut-off portion; the image region is inputted to both the mark cut-off portion and image period determining portion; the image period determining portion determines the period of grid image and dither image in the image region; the period information is notified to the mark cutoff portion; the cut-off mark is accumulated in an accumulating portion for use as a library and used for the match determining portion to determine whether or not there is a match library in old libraries and if there is a match library, both the mark and the match library are sent to a coding portion; and the coding portion carries out arithmetic coding by using a template for referring to the mark and the match library at the same time.

Still further, according to the present invention, there is obtained a coding method for a pattern matching coding device, wherein inputted first image data is accumulated in a memory; second image data of a necessary part is fetched from the memory by a boundary tracing portion and a mark is cut off; a first mark larger than a predetermined value is inputted from the boundary tracing portion and an observation window for observing a pixel on a straight line is moved in the first mark by the boundary tracing portion so as to search for a pixel having a high correlation; period information observed in the mark correlation check portion is sent and the first mark is redivided to a size matching with the period by a mark redividing portion; the redivided second mark is accumulated in a library by an accumulative FIFO memory; libraries accumulated in the accumulative FIFO memory are referred to and it is determined whether or not there is the library matching with the second mark or a third mark of normal size sent from the boundary tracing portion by a match determining portion; the library sent from the match determining portion is determined to match with a fourth mark and sent from the match determining portion together with the fourth mark to a match template; only the fourth mark from the match determining portion is sent to an unmatch template; and a template value from the ummatch template is outputted as an encoded code and a template value from the match template is outputted as an encoded code by an arithmetic coder.

DESCRIPTION OF THE PREFERRED EMBODIMENTS

Figure 1:
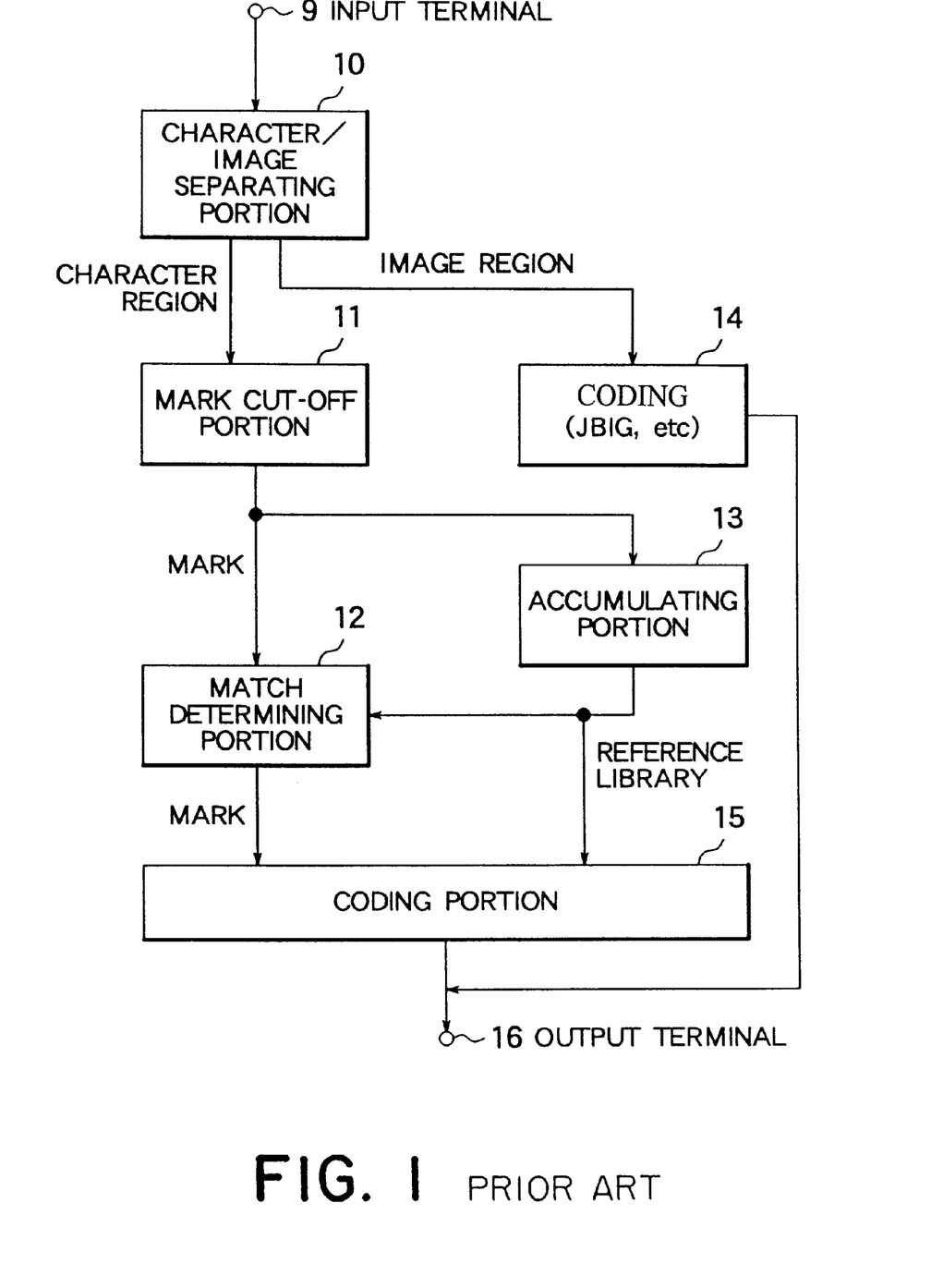
FIG. 1 is a block diagram showing a structure of a conventional pattern matching coding system.

FIG. 1 shows a block diagram of a structure of a conventional pattern matching coding system. Referring to FIG. 1, image data inputted through an input terminal 9 is separated to a character region in which characters are concentrated and an image region in which no character exists by a character/image separating portion 10. The image region in which no character exists is coded by a conventional coding device 14 such as JBIG (Joint Bi-level Image coding experts Group ITU-T T.82/ISO/IEC 11544) without effecting any special processing.

The character region in which characters are concentrated is subject to the following processing. First of all, a mark cut-off portion 11 cuts off the characters one by one from the character region in which characters are concentrated. Each cut-off character is called a mark.

The cut-off marks are accumulated in an accumulating portion 13 and each of the accumulated marks is inputted from the accumulating portion 13 into a coding portion 15 as reference library. The reference library inputted into the coding portion 15 is used as a future library. At the same time, the reference library outputted from the accumulating portion 13 is inputted into a match determining portion 12. The match determining portion 12 determines whether or not there is a library matching with the cut-off by the mark cut-off portion 11.

In case where the match determining portion 12 determines that there is a matching library, that matching library is sent to the coding portion 15 together with the cut-off mark and outputted through an output terminal 16.

Figure 2A:
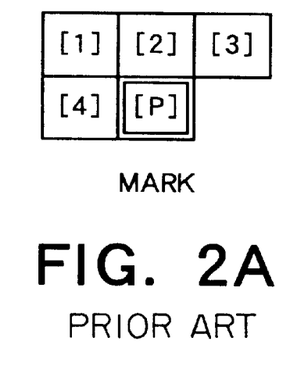
FIGS. 2A and 2B are explanatory views showing conventional match templates.
Figure 2B:
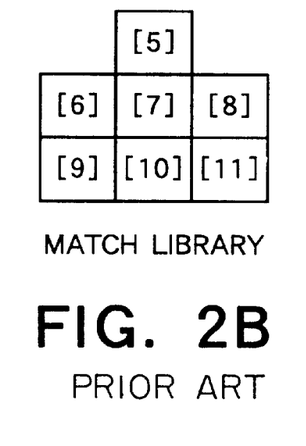
Figure 3:
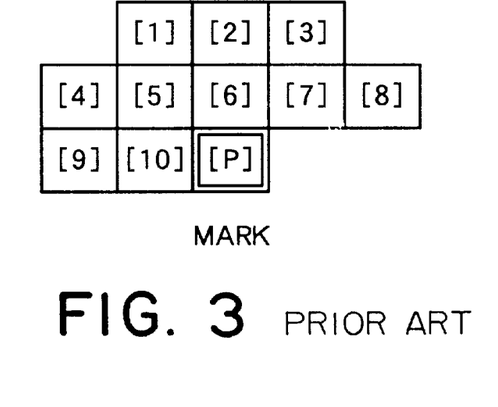
FIG. 3 is an explanatory view showing a conventional match template.

The coding portion 15 codes using a match template for the mark exemplified in FIG. 2A and a match template for the mark exemplified in FIG. 2B so as to be capable of referring to both the cut-off mark and match library. As a result, the coding amount is reduced because a higher coding efficiency is exhibited in comparison with an unmatch template for the mark exemplified in FIG. 3 which does not refer to the library. Incidentally, In FIGS. 2A and 2B and FIG. 3, the symbol [P] indicates a processing object pixel and the numbers [1]–[11] indicate reference pixels.

However, the conventional pattern matching coding system has such a problem that since only the character region is an object for processing and the conventional coding method is applied to the image region, compression ratio is not improved.

Further, according to the conventional method, since different coding portions need to be provided for the character region and image region, there is a problem that the circuit size is enlarged.

Hereinafter, the pattern matching coding device of the present invention and the coding method therefor will be concretely described with reference to the accompanying drawings.

Figure 4:
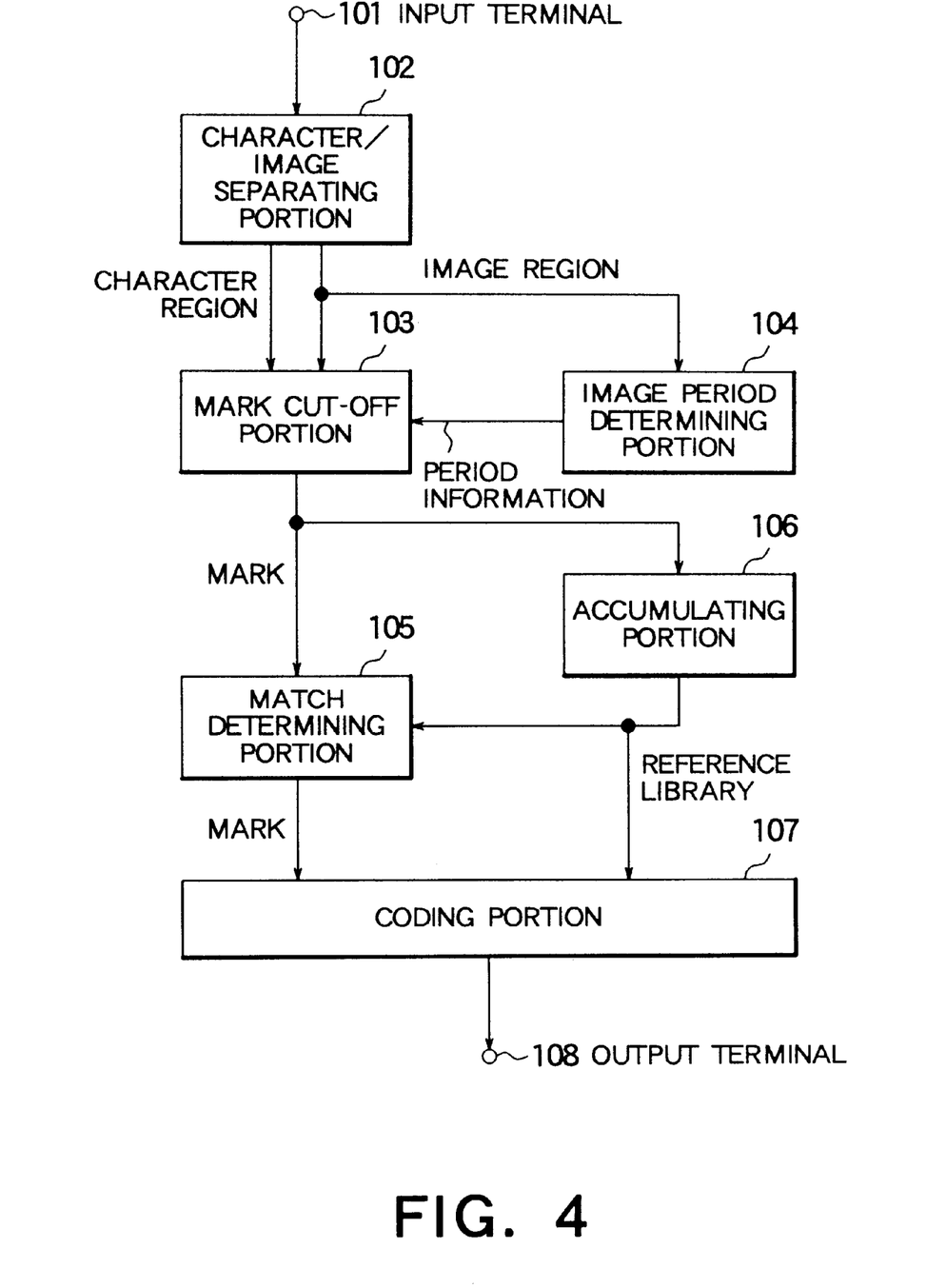
FIG. 4 is a block diagram showing a structure of an embodiment of a pattern matching coding device of the present invention.

FIG. 4 shows a structure of an embodiment of the pattern matching coding device of the present invention through a block diagram.

Referring to FIG. 4, the pattern matching coding device comprises an input terminal 101 through which image data is to be inputted, a character/image separating portion 102 for separating the image data inputted through the input terminal 101 to the character region and image region, a mark cut-off portion 103 for cutting off a mark from the character region, and an image period determining portion 104 for determining the period of a grid image and a dither image in the image region and notifying the period information to the mark cut-off portion 103.

Further, the pattern matching coding device further comprises a match determining portion 105 for determining whether or not there is a matching library in an old library, an accumulating portion 106 for accumulating a mark cut off by the mark cut-off portion 103 and using it as library, a coding portion 107 for carrying out arithmetic coding (;QM-coder) using a template to refer both the mark in the mark cut-off portion 103 and reference match library accumulated in the accumulating portion 6, and an output terminal 108 which is connected to the coding portion 107.

In this pattern matching coding device, image data inputted through the input terminal 101 is separated to the character region and image region by the character/image separating portion 102. From the character region, the mark is cut off by the mark cut-off portion 103 in the same manner as the conventional method. The image region is inputted to both the mark cut-off portion 103 and image period determining portion 104. The image period determining portion 104 determines the period of the grid image and dither image in the image region and notifies that period information to the mark cut-off portion 103. The mark cut-off portion 103 cuts off the mark from the image according to the period information. At this time, the mark size is the period or an integer multiple of the period.

As a result, as to the mark of an image having a period, it is possible to obtain a high matching ratio, so that a high compression ratio can be obtained. The mark cut off by the mark cut-off portion 103 is accumulated in the accumulating portion 106 for use as library, and by the match determining portion 105 it is determined whether or not there is a library matching with an old library.

If the match determining portion determines that there is a matching library, the matching library (hereinafter referred to as match library) is sent together with the mark to the coding portion 107. The coding portion 107 carries out arithmetic coding using a template for referring to both the mark and reference match library at the same time.

If there is no match library, only the mark is sent to the coding portion 107. In this case, the coding portion 107 carries out arithmetic coding using a template for referring to only the mark.

Figure 5:
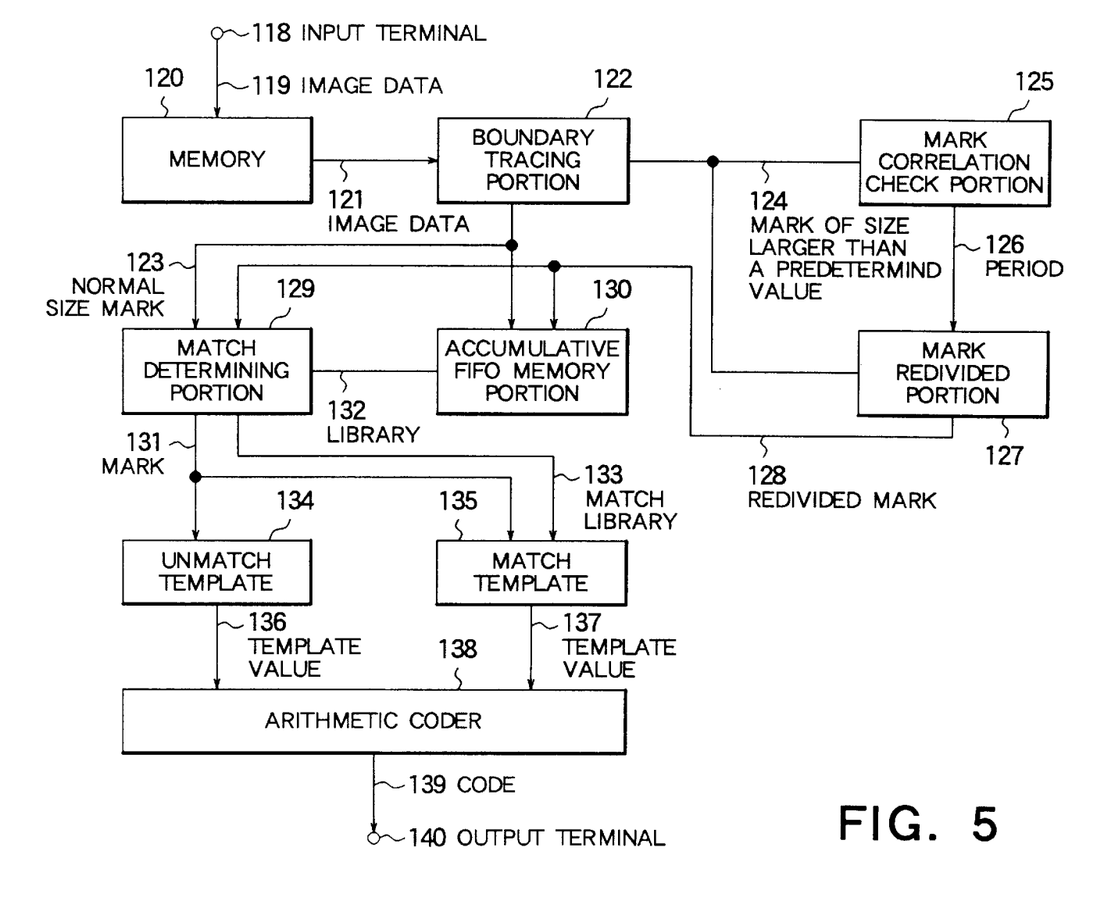
FIG. 5 is a block diagram showing a concrete example of the pattern matching coding device of the present invention.

Next, FIG. 5 shows a concrete example of the pattern matching coding device of the present invention. Incidentally, in this embodiment, the image data including the characters and grid image is an object for processing. For the following description, see FIG. 5.

The pattern matching coding device comprises an input terminal 118 through which image data 119 is to be inputted, a memory 120 for accumulating image data 119 inputted through the input terminal 118, a boundary tracing portion 122 for fetching a image data 121 of necessary part from the memory 120 and cutting off a mark, and a mark correlation check portion 125 to which a mark 124 larger than a predetermined value is to be inputted from the boundary tracing portion 122 and which is provided with an observation window for observing pixels on a straight line, the observation window being moved in the mark 124 so as to search for a pixel having a high correlation.

The pattern matching coding device further comprises a mark redividing portion 127 to which period information observed by the mark correlation check portion 125 is to be sent and which redivides the mark in accordance with a size matching with the period, an accumulative FIFO memory (first-in first-out memory) 130 for accumulating redivided mark 128 into the library, a match determining portion 129 for referring to a library 132 accumulated in the accumulative FIFO memory 130 and determining whether or not there is a library matching with the redivided mark 128 or normal size mark 123 sent from the boundary tracing portion 122, a match template 135 in which it is determined that a library sent from the match determining portion 129 matches with the mark 131 and that library is sent as a match library 133 together with the mark 131, an unmatch template 134 to which only the mark 131 from the match determining portion 129 is to be sent, and an arithmetic coder 138.

The arithmetic coder 138 outputs a template value 136 from the unmatch template 134 as an encoded code 139 through an output terminal 140 and outputs a template value 137 of the match template 135 as an encoded code 139 through the output terminal 140.

Incidentally, if there are plural of matching libraries, a library found first is selected. If there is no matching library, only the mark 131 from the match determining portion 129 is sent to the unmatch template 134.

In this pattern matching coding device, the image data 119 inputted through the input terminal 118 is accumulated in the memory 120. The boundary tracing portion 122 fetches the image data 121 of necessary part from the memory 120 and cuts off a mark by the boundary tracing method. At this time, if the size of the cut-off mark is below a predetermined value, it is determined to be a character region or a region of grid image in which the grids are independent.

Figure 6:
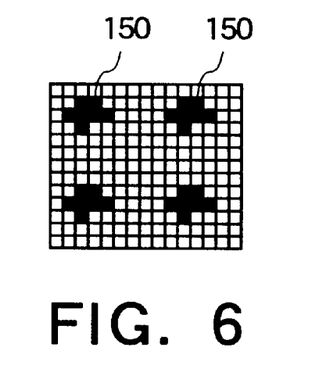
FIG. 6 is an explanatory view showing a region of grid image in which grids are independent in an embodiment of the pattern matching coding device of the present invention.

The region of grid image in which the grids are independent means a region in which a grid 150 is separated from an adjacent grid 150 as shown in FIG. 6. If the size of the cut-off mark 124 is over a predetermined value, it is determined to be a region of grid image in which a plurality of the grids 150 are connected to each other. The region in which a plurality of the grids 150 are connected to each other means a region shown in FIG. 7.

Figure 7:
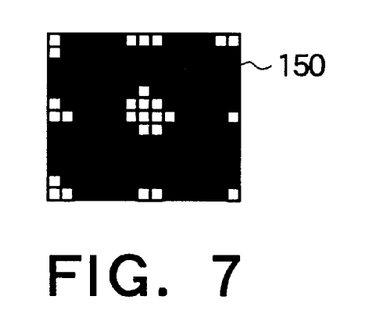
FIG. 7 is an explanatory view showing a region in which a plurality of grids are connected to each other in an embodiment of the pattern matching coding device of the present invention.

If the region shown in FIG. 7 is subjected to boundary tracing by the boundary tracing portion 122, since the entire connected region is cut off as a single mark, the size of the mark is so large that the possibility that it matches upon pattern match is reduced.

Figure 8:
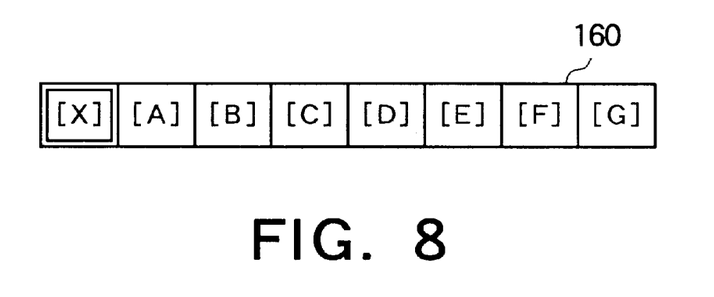
FIG. 8 is an explanatory view showing an observation window in an embodiment of the pattern matching coding device of the present invention.

A mark 124 larger than a predetermined value is inputted into the mark correlation check portion 125. The mark correlation check portion 125 is provided with an observation window 160 for observing a pixel on a straight line as shown in FIG. 8 and by moving the observation window 160 in the mark, a pixel having a high correlation is searched. Incidentally, in FIG. 8, the symbol [X] indicates a reference pixel and the symbols [A]–[G] indicate observation pixels.

Figure 9:
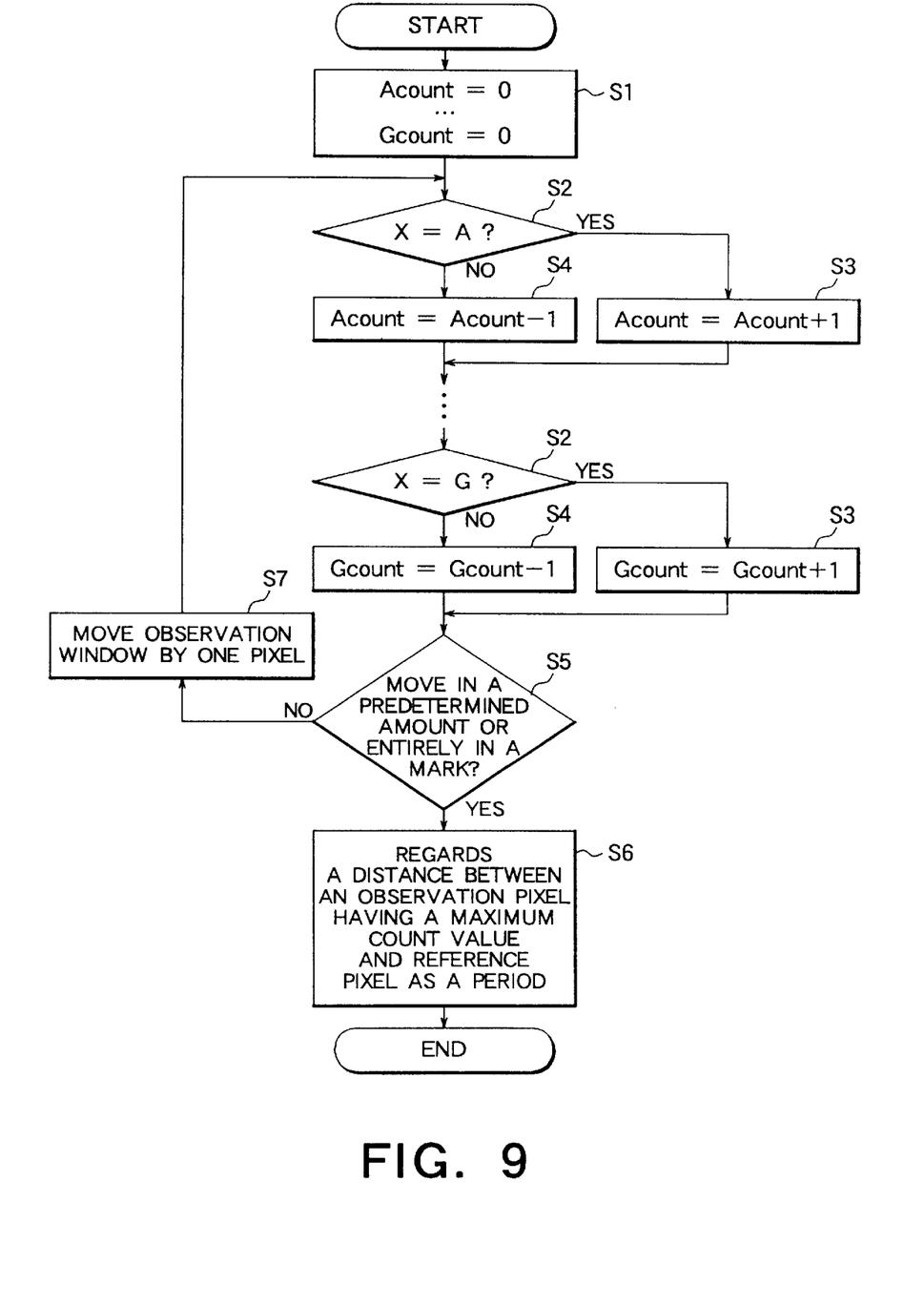
FIG. 9 is a flowchart showing a flow of processing in a mark correlation check portion of the pattern matching coding device of the present invention.

Next, FIG. 9 shows a flow of processing in the mark correlation check portion 125. First of all, counters (A counter, B counter, . . . G counter) corresponding respectively to the observation pixels [A]–[G] are prepared (step S1). Next, it is determined whether or not each of the observation pixels [A]–[G] matches with the reference pixel [X] (X=A?) (steps S2). If each of the observation pixels [A]–[G] matches with the reference pixel [X] (same color), the corresponding counter is incremented by 1 (A count=A count+1) (step S3). If each of the observation pixels does not match with the reference pixel, the corresponding counter is decremented by 1 (A count=A count−1) (step S4).

In such a flow, the observation window 160 is repeatedly moved in the mark for X=A–G and it is determined whether or not the observation window has moved in a predetermined amount or moved entirely in the mark (step S5). And, if the observation window has moved in a predetermined amount or entirely in the mark, this processing is terminated and then it is investigated which counter has a maximum value. A distance between the observation pixel [A]–[G] corresponding to the counter having the maximum value and the reference pixel [X] becomes a period (step S6). For example, if the counter of the observation pixel [C] has the maximum value, a distance between the observation pixel [A] and the reference pixel [X] or three pixels is the period.

Further, if the observation window has not moved in a predetermined amount or entirely in the mark, the observation window 160 is moved by a single pixel to return the processing to step S2 and then the following steps are repeated.

Returning to FIG. 5, the period information 126 observed by the mark correlation check portion 125 is sent to the mark redividing portion 127. The mark redividing portion 127 redivides the mark 124 in a size matching with the period and outputs it as the mark 128. The redivided mark 128 is accumulated in the accumulative FIFO memory 130 and added to the library and used for match determination in the match determining portion 129.

The match determining portion 129 refers to the library 132 accmulated in the accumlative FIFO memory 130 and determines whether or not there is a library matching with the mark. In this embodiment, the matching library needs to satisfy the following conditions.

I. The library size and mark size are smaller than a predetermined value both in the longitudinal and lateral directions (for example, below one pixel both in the longitudinal and lateral directions).

II. When the library is overlapped with the mark, the number of pixels not matching is smaller than a predetermined value (for example, below 20 pixels).

A library satisfying the above conditions is determined to match with the mark and sent to the match template 135 together with the mark 131 as the match library 133. In case where there are a plurality of matching libraries, a library found first is selected. In case where there is no matching library, only the mark 131 is sent to the unmatch template 134.

The template value 136 from the unmatch template 134 is coded by the arithmetic coder 138 and outputted as the code 139 through the output terminal 140. In the same manner, the template value 136 from the match template 135 is outputted through the output terminal 140 as the code 139 encoded in the arithmetic coder 138.

Hereunder, a flow of the operation of the pattern matching device shown in FIG. 5 will be described. First of all, after processing of the image data 121 is started, the boundary tracing portion 122 cuts off one mark contained in the image data 121 by boundary tracing. Next, it is determined whether or not the cut-off mark is larger than a predetermined size. If the cut-off mark is larger than the predetermined size, since the possibility that that mark 124 is not a character is high, its correlation check is carried out by the mark correlation check portion 125 and it is determined whether or not that mark has a periodicity. If it has a periodicity, the mark 124 is redivided in a size watching with the period by the mark redividing portion 127. The divided mark 128 is registered in the library and then it is determined whether or not there is a matching library in libraries previously registered.

If there is a match library, the match library 133 and the mark 131 are coded by using the match template 135. If there is not match library, only the mark 131 is coded by using the unmatch template 134. The above processing is repeated until all the marks 131, 133 are processed and if all the marks have been processed, the processing is terminated.

As described above by the embodiment, according to the pattern matching device of the present invention and the coding method therefor, the mark is divided to marks having a predetermined size so as to improve the matching rate. Thus, the present invention is capable of providing the pattern matching coding device in which the pattern matching coding system which can be conventionally applied only to the character region can be applied to the image region, and the coding method therefor Further, according to the present invention, specifically for an image having a periodicity, a higher coding efficiency can be achieved by matching the period with a pattern size.

Further, according to the present invention, since no additional coder is necessary for image region processing, the circuit size can be reduced.

What is claimed is:

1. A pattern matching coding device comprising:
   a memory that accumulates inputted first image data;
   a boundary tracing portion that fetches second image data of a necessary part from said memory and cuts off a mark;
   a mark correlation check portion in which a first mark larger than a predetermined value is inputted from said boundary tracing portion and an observation window configured to observe a pixel on a straight line is moved in said first mark so as to search for a pixel having a high correlation;
   a mark redividing portion that sends period information observed in said mark correlation check portion and redivides said first mark to generate a second mark having a size matching with the period;
   an accumulative FIFO memory that accumulates the redivided second mark;
   a match determining portion that refers to libraries accumulated in said accumulative FIFO memory and determines whether or not there is any library matching with said second mark or a third mark of normal size sent from said boundary tracing portion;
   a match template to which, by determining that said library sent from said match determining portion matches with a fourth mark, said library is sent from said match determining portion together with said fourth mark as a match library;
   an unmatch template to which only said fourth mark from said match determining portion is sent;
   an arithmetic coder that outputs a template value of said unmatch template as an encoded code and outputs a template value from said match template as an encoded code.

2. A coding method for a pattern matching coding device, wherein:
   inputted first image data is accumulated in a memory;
   second image data of a necessary part is fetched from said memory by a boundary tracing portion and a mark is cut off;
   a first mark larger than a predetermined value is inputted from said boundary tracing portion and an observation window for observing a pixel on a straight line is moved in said first mark by said boundary tracing portion so as to search for a pixel having a high correlation;
   period information observed in said mark correlation check portion is sent and said first mark is redivided to generate a second mark having a size matching with the period by a mark redividing portion;
   the redivided second mark is accumulated in a library by an accumulative FIFO memory;
   a plurality of said libraries accumulated in said accumulative FIFO memory are referred to and it is determined whether or not there is said library matching with said second mark or a third mark of normal size sent from said boundary tracing portion by a match determining portion;
   said library sent from said match determining portion is determined to match with a fourth mark and sent from said match determining portion together with said fourth mark to a match template;
   only said fourth mark from said match determining portion is sent to an unmatch template; and a template value from said unmatch template is outputted as an encoded code and a template value from said match template is outputted as an encoded code by an arithmetic coder.

3. A coding method for a pattern matching coding device as claimed in claim 2, wherein if there are a plurality of the match libraries, a library found first is selected and if there is no match library, only said fourth mark from the match determining portion is sent to said unmatch template.

4. A coding method for a pattern matching coding device as claimed in claim 2, wherein when said boundary tracing portion fetches said second image data of a necessary part from said memory and cuts-off said mark, said cut off mark is smaller than a predetermined value, said mark is determined to be a character region or a region of a grid image having independent grids.

5. A pattern matching coding device, comprising:

a boundary tracer that receives stored image data, cuts off a mark and generates a first output or a second output in accordance with a size of said mark;

a mark correlator that comprises an observation window that generates a period in accordance with said first output;

a mark redivider that receives said second output, redivides said mark in accordance with information of said period, and stores said redivided mark;

a match determining device that determines whether a match exists between said redivided mark or said second output and an old library, and generates a match output in accordance with a result of said determination;

an accumulator that generates a new library in accordance with said redivided mark or said second output;

a template that receives said match output and generates a template value; and a coder that performs an operation on said template value to generate an encoded output.

6. The device of claim 5, wherein said template receives only said second output or said redivided mark when no match exists with said old library and said second output or said redivided mark, and said template receives said second output or said redivided mark when a match exists between said old library and said second output or said second redivided mark.

7. The device of claim 5, wherein said first output is generated when said mark exceeds a size threshold, and said second output is generated when said mark is less than or equal to said size threshold.

8. The device of claim 5, further comprising an accumulative FIFO memory that stores said redivided mark.

9. The device of claim 5, wherein said period information comprises a distance between a counter corresponding to a maximum value of a plurality of observation pixels, and a reference pixel.

10. The device of claim 5, wherein said mark comprises a unit of a single character.

11. The device of claim 5, wherein said mark size comprises an integer multiple of said period.

* * * * *